United States Patent
Larson

[19]

[11] Patent Number: 5,838,962
[45] Date of Patent: Nov. 17, 1998

[54] INTERRUPT DRIVEN DYNAMIC ADJUSTMENT OF BRANCH PREDICTIONS

[75] Inventor: Douglas V. Larson, Santa Clara, Calif.

[73] Assignee: Hewlett-Packard Company, Palo Alto, Calif.

[21] Appl. No.: 840,080

[22] Filed: Apr. 9, 1997

[51] Int. Cl.[6] .................................................. G06F 9/32
[52] U.S. Cl. ............................................................ 395/586
[58] Field of Search ................................... 395/584, 585, 395/586, 587, 704, 709, 183.11, 183.14

[56] References Cited

U.S. PATENT DOCUMENTS

| | | |
|---|---|---|
| 4,124,893 | 11/1978 | Joyce et al. . |
| 4,176,394 | 11/1979 | Kaminski et al. . |
| 4,370,711 | 1/1983 | Smith . |
| 4,435,756 | 3/1984 | Potash . |
| 4,679,141 | 7/1987 | Pomerene et al. . |
| 4,901,233 | 2/1990 | Liptay . |
| 5,367,703 | 11/1994 | Levitan ..................................... 395/587 |
| 5,659,752 | 8/1997 | Heisch et al. ............................ 395/586 |
| 5,715,440 | 2/1998 | Ohmura et al. ......................... 395/704 |
| 5,717,909 | 2/1998 | Nemirovsky et al. .................. 395/704 |

OTHER PUBLICATIONS

Jourdan et al, A High Out-of-Order Issue Symmetric Superpipeline Superscalar Microprocessor, IEEE, 1994.

Sonh et al., An Implementation of Branch Target Buffer for High Performance Applications, IEEE, 1995.

*Primary Examiner*—Richard L. Ellis
*Attorney, Agent, or Firm*—David A. Plettner

[57] ABSTRACT

Branch predictions are adjusted by interrupting a central processing unit and observing a pending branch instruction. An interrupt is generated using a counter, timer, or software-based interrupt. The interrupt causes a prediction adjustment routine to execute, which in turn determines whether a pending branch instruction will branch. The actual branch behavior of the branch instruction is compared to the predicted branch behavior of the branch instruction, and the prediction is adjusted accordingly based on the accuracy of the prediction and previous branch behavior. After the prediction has been adjusted (if necessary), execution returns to the program that contains the branch instruction that was evaluated.

23 Claims, 3 Drawing Sheets

INTERRUPT DRIVEN DYNAMIC ADJUSTMENT OF BRANCH PREDICTIONS

FIELD OF THE INVENTION

The present invention relates to the execution of computer instructions in a computer system. More specifically, the present invention relates to a method and apparatus for generating a branch prediction for a computer branch instruction by interrupting a processor and observing a pending branch instruction.

Description of the Related Art

Early computer systems serially executed one computer instruction at a time, and did not start executing an instruction until the previous instruction had completed. As the art of computer design progressed, computer designers began to incorporate various types of parallelism into computer systems.

One type of parallelism is pipelining. Pipelining breaks down the execution of a computer instruction into various steps, and processes multiple instructions simultaneously by overlapping these steps. Another type of parallelism is superscaling. Superscaling uses multiple execution units to process separate instructions simultaneously.

Parallel design techniques create problems for branch instructions. Often, when a branch instruction is executed, the condition that the branch instruction must test has not yet been determined. Early computer systems simply halted execution of the branch instruction (and subsequent instructions) until the condition was determined. However, this hurts performance. In a pipelined computer, often the pipeline must be emptied before the condition can be determined, which limits the benefits achieved by pipelining.

To address this problem, computer designers started to include mechanisms that predict branch behavior. When a branch instruction is encountered, the branch behavior of the branch instruction is predicted. Later, when the condition can be evaluated, the prediction is also evaluated to determine if it is correct. If the prediction is correct, execution continues and the advantages achieved by parallel execution are preserved. If the prediction is incorrect, instructions that were provisionally executed must be purged from the pipeline and the instructions from the correct branch must be executed. However, the penalty for an incorrect branch is typically not any worse than halting execution and waiting for the condition to be determined.

The performance gains achieved by branch prediction are, of course, strongly related to the accuracy of the prediction. Accordingly, many techniques have been developed to provide accurate branch predictions. One of the earliest techniques was to simply predict that a branch is always taken. Statistically, most branches are taken, so this technique proved somewhat successful. A similar technique predicts that backward branches are always taken, and forward branches are never taken.

Another technique uses an address table of addresses to which branch instructions recently branched. Typically, the table consists of an associative memory having 4 to 8 entries. If an address in a branch instruction also appeared in the table, then that address is used as the predicted execution path.

A more sophisticated approach was disclosed by James E. Smith in U.S. Pat. No. 4,370,711. Smith disclosed a random access memory (RAM) having, for example, 16 entries, each containing a two bit count capable of assuming the values +1, 0,−1, and −2. A hash mechanism transforms the branch instruction address into a four bit address that accesses the RAM. If the value stored in an entry associated with a branch instruction is +1 or 0, then the branch is predicted as taken. Otherwise, the prediction is that the branch is not taken. After the branch instruction is executed, if it is taken, the count memory entry is incremented up to a limit of +1. If it is not taken, the count memory address is decremented down to a limit of −2. The prediction scheme disclosed by Smith incorporates branch history in the formulation of the branch prediction. For example, if the branch has been taken several times, it must be not taken twice in a row to change the prediction. Many computer systems use some variation of this scheme, with a table that stores a prediction and a hash function that associates a branch instruction with a prediction.

Another approach is disclosed by Hanan Potash in U.S. Pat. No. 4,435,756. Potash discloses encoding a branch prediction in each branch instruction based on whether it is probable that the branch condition will be evaluated as being true or false. In another embodiment, Potash discloses encoding branch history and a branch prediction in a branch instruction. In this embodiment, if the prediction proves to be incorrect two times in a row, the prediction is changed, which requires encoding a new prediction into the branch instruction and writing the branch instruction back to memory. Note that the branch instruction must also be written back to memory whenever branch history changes, even if the prediction does not change. This creates a large amount of write data, which lowers I/O throughput. For example, a branch instruction that alternates between two branch paths must be written back to memory every time it is executed.

Computer systems manufactured by Hewlett-Packard Company have used two types of branch prediction; a hardware-based branch prediction scheme that uses a prediction table to store dynamically generated branch predictions close to the CPU, and a software-based branch prediction scheme that encodes static branch predictions into each branch instruction when a computer program is compiled. With software-based branch prediction, the prediction is encoded in the branch instruction based on the order of the operands in the compare function. For example, consider the following compare and branch (COMB) instructions:

COMB,<R5,R3,Address, and

COMB,>=R3,R5,Address.

The branch prediction encoded in the first instruction is the opposite of the branch prediction encoded in the second instruction, even though the instructions are logically identical.

To generate effective predictions, it is necessary to perform a "profile-based optimization" (PBO) run, wherein branching behavior is observed while an application is executing in a typical computing environment. After the PBO run is complete, the user's applications are recompiled to incorporate updated branch predictions based on branching behavior observed during the PBO run.

The advantages of software-based branch prediction are that the prediction can be based on behavior observed over an extended period, not just the last branch or two. Also, software-based branch prediction requires less complex, less expensive hardware. It is much simpler to design hardware that only implements a branch prediction, compared to hardware that must also judge the accuracy of predictions and update predictions accordingly.

The disadvantages of software-based branch prediction are that the prediction is static and does not adapt to changes in program data or the computing environment. Once the prediction is compiled into the branch instruction, it is not changed. Also, customers do not like to perform the PBO run, which is needed to achieve high levels of branch prediction performance.

The advantages of hardware-based branch prediction are that it is completely transparent to the user of the computer system, it adapts dynamically to changes in the computing environments that may affect branching (such as changes in information stored in databases), and it tends to be very accurate when the prediction table is large or a prediction can be associated with each instruction, as disclosed by Potash.

The disadvantages of hardware-based branch prediction are that it is expensive to implement, and to date, not many computers are configured to use hardware branch prediction. To increase efficiency and reduce the number of logic gates, prediction tables typically store a limited number of branch instructions and often store none or only a portion of the address of a branch instruction. This can cause the prediction scheme to be overwhelmed by aliasing, thereby causing a prediction to be generated that is not based on the actual branch instruction being executed. Aliasing can be a significant problem for programs having many frequently executed branch instructions, such as database programs.

SUMMARY OF THE INVENTION

The present invention is a method and apparatus for dynamically adjusting the branch prediction associated with a branch instruction by periodically interrupting the central processing unit of a computer and executing a prediction adjustment routine that observes a pending branch instruction. If a branch instruction is not pending, the prediction adjustment routine ends and execution of the interrupted instruction stream resumes. If a branch instruction is pending, the branch instruction is evaluated and compared with a branch prediction associated with the branch instruction. If the prediction is correct, execution of the interrupted instruction stream is resumed. If the prediction is not correct, then the prediction is evaluated to determine whether it should be changed. In one embodiment, prior branch history of the branch instruction is also used to determine whether the branch prediction should be changed.

DETAILED DESCRIPTION OF THE PREFERRED EMBODIMENTS

Figure 1:
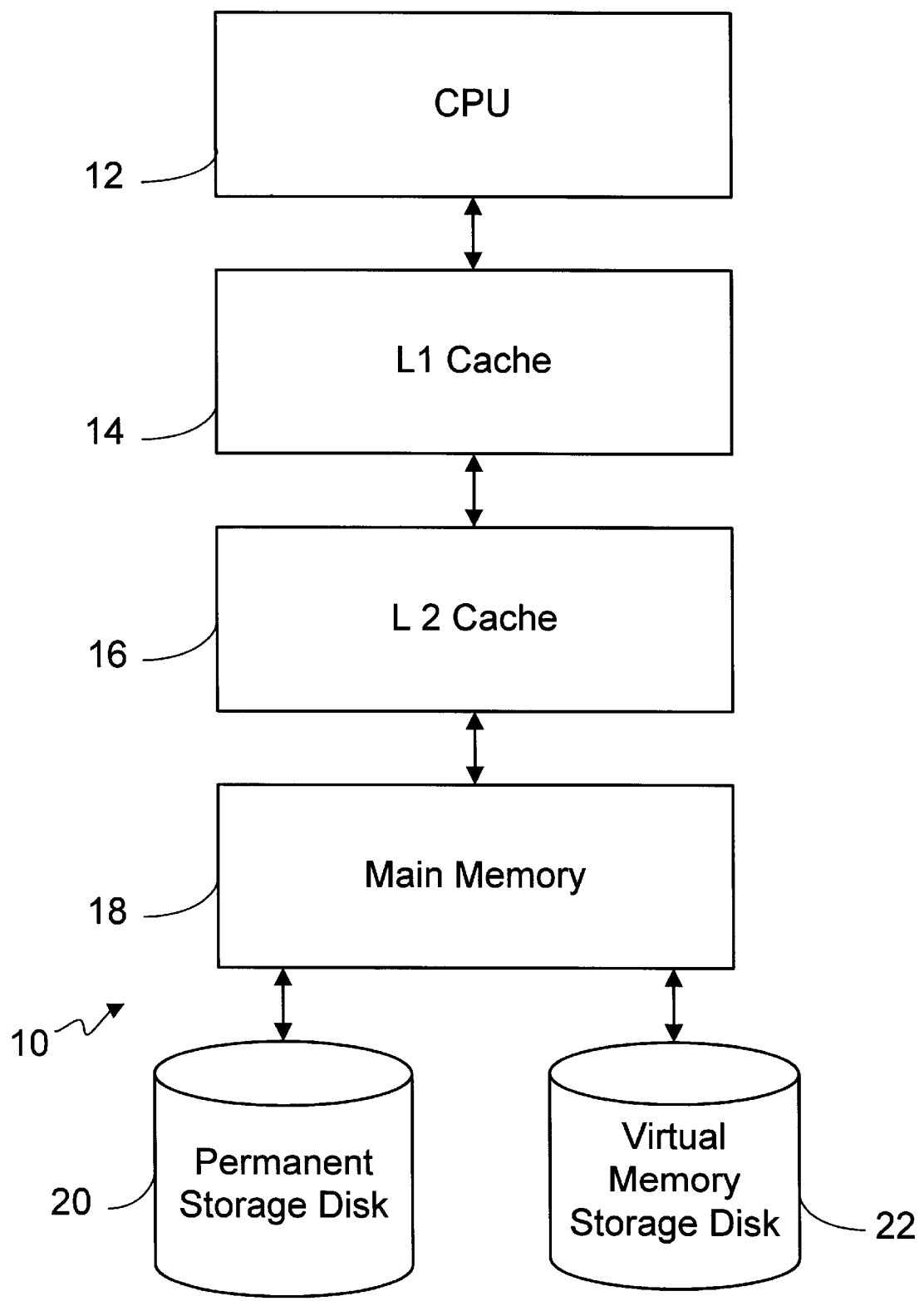
FIG. 1 is a simplified block diagram of a computer system.

FIG. 1 is a simplified block diagram of a computer system 10. Computer system 10 includes a central processing unit (CPU) 12, level 1 (L1) cache 14, level 2 (L2) cache 16, main memory 18, permanent storage disk 20, and virtual memory storage disk 22. In many computer systems, permanent storage disk 20 and virtual memory storage disk 22 are embodied on the same physical hard drive.

FIG. 1 illustrates the various locations at which program code is stored before, during, and after execution. When a program is first executed, the program code is retrieved from permanent storage disk 20 and stored in main memory 18. As portions of the program code are executed, those portions are stored in L2 cache 16 and L1 cache 14. As is known in the art, L1 cache 14 is typically implemented as very fast memory that is close to CPU 12. Often it exists on the same integrated circuit as the CPU. L2 cache 16 is somewhat slower and larger. Finally main memory 18 is very large, and slower than L2 cache memory 16.

As programs and data are stored in main memory 18, the size of the programs and data may exceed the physical size of memory 18. When this happens, memory pages from memory 18 are stored on virtual memory storage disk 22, thereby making additional memory space available in memory 18. When a program references a memory page that has been stored on disk 22, the memory page is retrieved, and if necessary, other pages are swapped out to disk 22.

FIG. 1 illustrates a typical computer architecture that is common in the field of computing. The present invention will be described below with reference to FIG. 1, but those skilled in the art will recognize that the present invention may be implemented on a variety of other computer architectures, such as computer systems that have fewer or additional cache memories, computers with multiple CPUs, etc.

Figure 2:
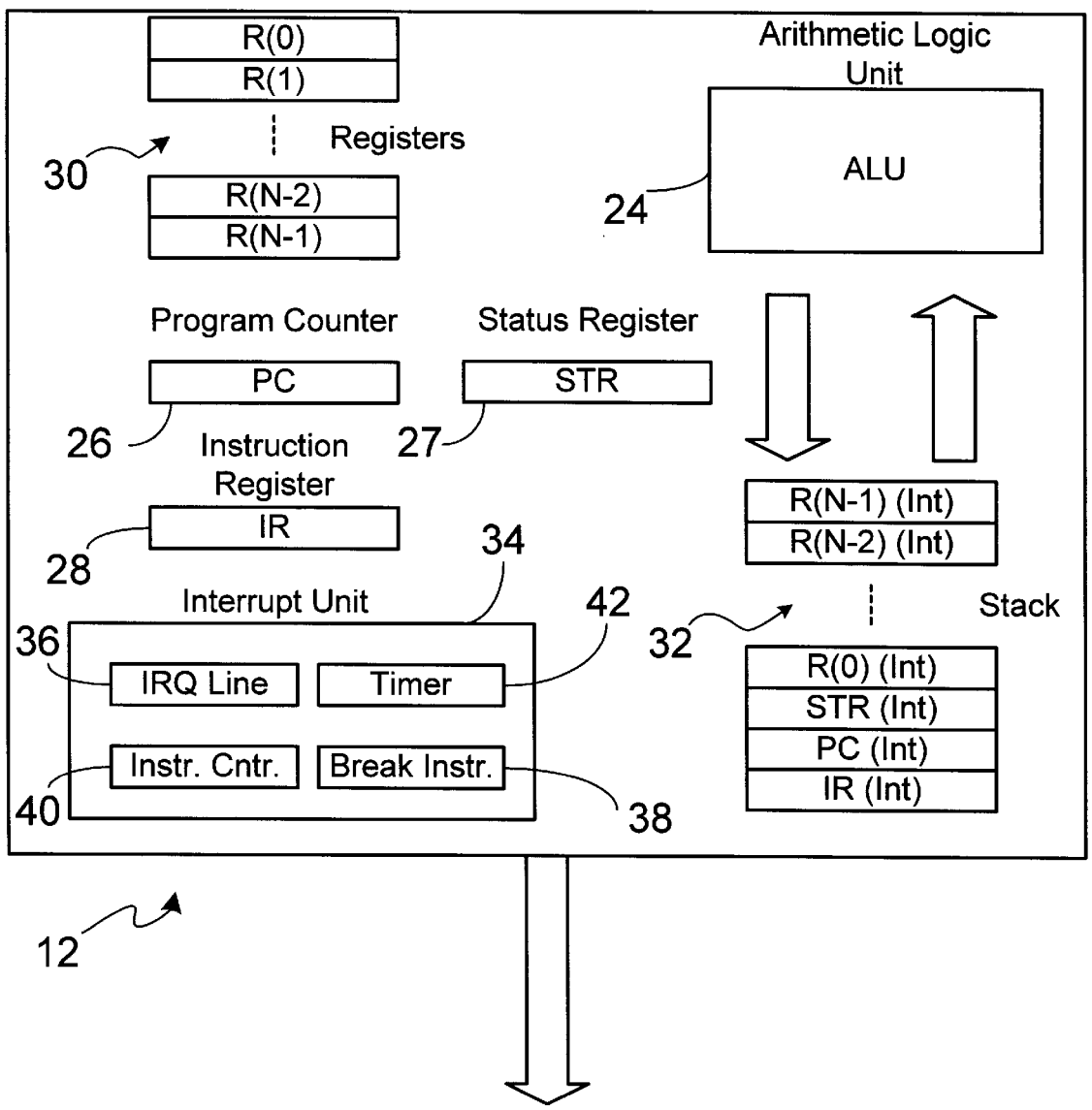
FIG. 2 is a block diagram of a portion of a CPU that is part of the computer system shown in FIG. 1.

FIG. 2 is a block diagram of a portion of CPU 12 of FIG. 1. CPU 12 includes an arithmetic logic unit (ALU) 24, a program counter (PC) 26, a status register (STR) 27, and instruction register (IR) 28, a register stack 30, last-in first-out (LIFO) stack 32, and interrupt unit 34. ALU 24 performs various mathematical operations, such as adding, subtracting, multiplying, shifting, comparing, and the like. Registers 30 store data that is used by ALU 24. PC 26 stores an address that references the memory location of the current instruction being executed, IR 28 stores the current instruction being executed, LIFO stack 32 provides temporary storage to CPU 12, and interrupt unit 34 processes interrupts. Status register 27 includes status bits that control and determine various modes of CPU 12.

Interrupt unit 34 responds to interrupts, and is also capable of generating interrupts. For example, IRQ line 36 represents externally generated hardware interrupts, such as a network adaptor asserting a hardware interrupt on a bus. Break instruction 38 represents software interrupts, such as BREAK or TRAP instructions that may be placed in the program code. Timer 42 represents interrupts that are generated based on a timer value, such as a real time clock that interrupts CPU 12 at a periodic interval. Finally, instruction counter 40 represents interrupts that are generated after a certain number of instructions. The values used by instruction counter 40 and timer 42 may be altered by the operating system.

When interrupt unit 34 processes an interrupt, the values stored in registers 30, PC 26, STR 27, and IR 28 are stored on LIFO stack 32. This is depicted in FIG. 2 by showing each of these values, along with the label "(Int)", stored in LIFO stack 32. After these values are stored on LIFO stack 32, an interrupt service routine (ISR) associated with the particular interrupt being processed is executed. After the ISR has been processed, the values are removed from LIFO stack 32 and restored to their original locations.

While the ISR is executing, it has access to the values stored on LIFO stack 32. Accordingly, the ISR can examine the instruction that was being executed when the interrupt occurred, the address at which that instruction is stored in main memory, and the contents of the registers at the time the interrupt occurred.

FIGS. 1 and 2 show a CPU architecture that is much simpler than modern CPU architectures known in the art of computing. Modern CPUs include multiple execution units, pipelines, circuitry to support out-of-order execution, and the like. However, the architecture shown in FIGS. 1 and 2 is sufficient to illustrate the present invention. While the present invention will be described below with reference to FIGS. 1 and 2, those skilled in the art will recognize that the present invention may be implemented on a variety of other computer architectures.

The present invention is a method and apparatus for dynamically adjusting branch predictions by interrupting the CPU and observing pending branch predictions. As used herein, the term "branch instruction" generally applies to branch instructions that branch based on a condition. Of course, if the branch instruction is an unconditional branch instruction that always branches to the same location, there is no need to predict whether the branch will be taken. On the other hand, many computer systems manage certain aspects of execution of unconditional branch instructions (for example, keeping the pipeline full) within a general branch prediction framework. Therefore, predicting branch behavior of unconditional branch instructions is within the scope of the present invention.

Figure 3:
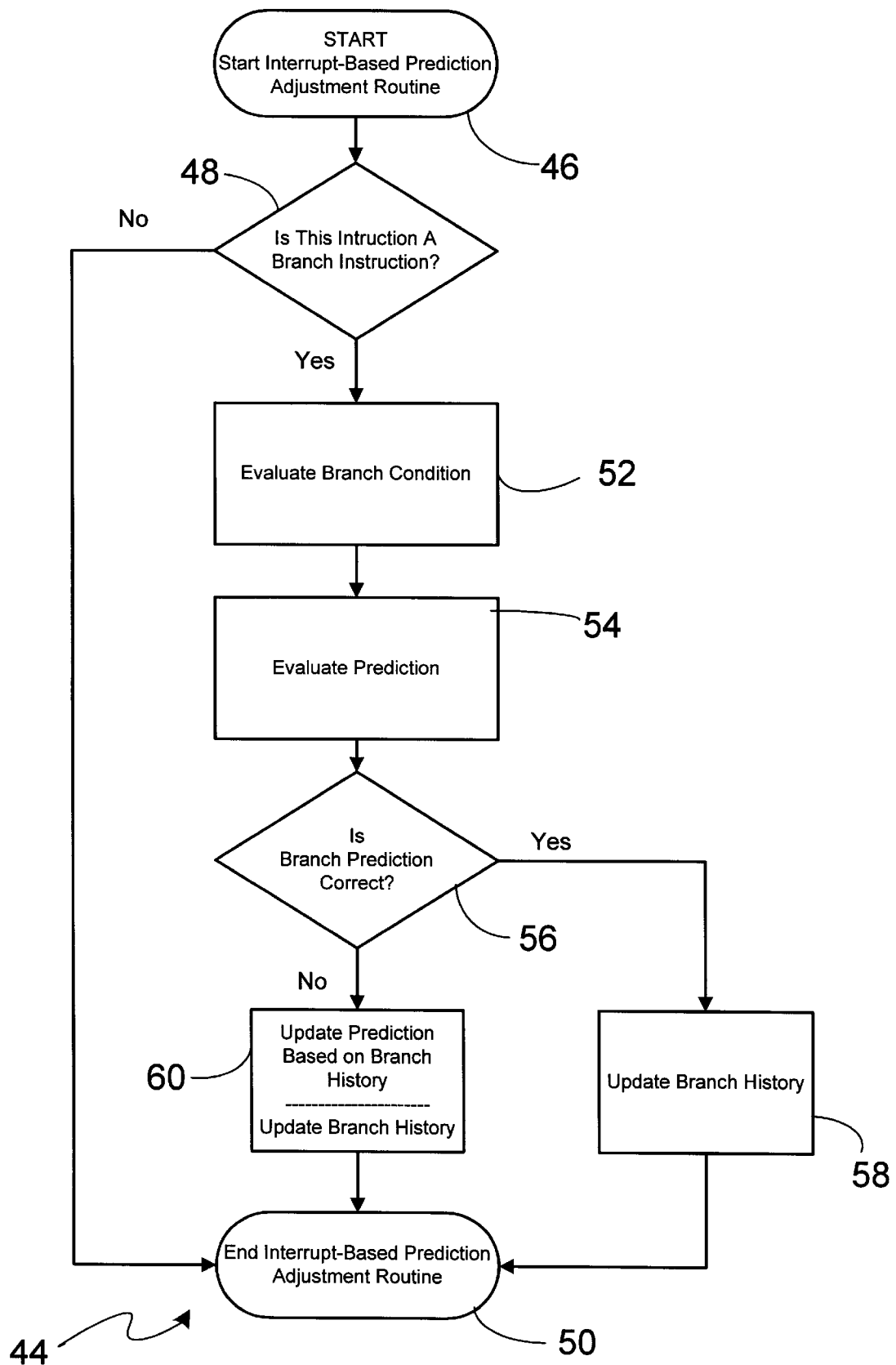
FIG. 3 is a flow chart of an interrupt-based prediction adjustment routine in accordance with the present invention.

FIG. 3 is a flow chart of an interrupt-based prediction adjustment routine 44 in accordance with the present invention. While routine 44 may be implemented in software as an ISR, the present invention may also be implemented partially or completely in hardware.

At block 46, the routine 44 is started. With reference to FIG. 2, there are several methods that may be used to generate an interrupt to start routine 44. Timer 42 may be configured to generate an interrupt at a periodic interval. Alternatively, instruction counter 40 may be configured to generate an interrupt after a certain number of instructions. Both the time interval and the instruction count can be varied on a random basis to ensure that the processor is interrupted at different locations in program code.

One advantage of the instruction counter over the timer is that for some computer architectures, the instruction counter may produce a more even distribution of prediction evaluations across all branch instructions. For example, in some implementations of the PA-RISC architecture, an interrupt at a level appropriate for use with the present invention is deferred until the instruction being executed is completed, then the interrupt is serviced. Consider a load instruction that often generates a cache miss and takes a relatively large amount of time to complete. If a timer generates the interrupt, a branch instruction immediately following a load instruction will be evaluated more frequently than a branch instruction immediately following an add instruction because the total time required to execute both the branch instruction and the load instruction is dominated by the cache miss. Therefore there is an increased probability that a timer interrupt will occur during a cache miss, and the interrupt will be processed at the next instruction. The instruction counter does not suffer from this problem.

While relatively frequent interrupts lead to a higher level of prediction accuracy, frequent interrupts also incur higher overhead. It has been found that an interrupt interval of approximately 0.01 seconds or an instruction count of approximately one interrupt every 15 million instructions produces relatively high prediction accuracy, while incurring a minimal overhead.

Another method of generating the interrupt that launches routine 44 is to replace various condition-based branch instructions with BREAK instructions. When a BREAK instruction is encountered by CPU 12, interrupt unit 34 launches routine 44, which replaces the BREAK instruction with the proper branch instruction, and evaluates the branch instruction as described below. Using this method, the branch instruction can initially be replaced by a BREAK instruction by a separate interrupt service routine, routine 44, or some other program.

Finally, in another embodiment CPU 12 of FIG. 2 may be configured to selectively treat branch instructions as BREAK instructions based on a status flag in status register 27. In this embodiment, whenever the status flag is set, a branch instruction generates a software interrupt that is serviced by routine 44. This embodiment may also be used in conjunction with either instruction counter 40 or timer 42 to set the status flag after a certain interval or a certain number of instructions, thereby generating a software interrupt at the first branch instruction encountered after a certain time interval or instruction count, as described above.

Returning to FIG. 3, after routine 44 is started at block 46, decision block 48 determines whether the instruction pending is a branch instruction. Note that block 48 is not necessary if CPU 12 is configured to generate in interrupt when a branch instruction is pending, as described above. However, when used in a computer system that is not capable of generating an interrupt based on a branch instruction, step 48 is necessary to determine whether a condition-based branch instruction has been "caught" by the interrupt. In a typical mix of computer instructions, condition-based branch instructions comprise approximately 15% of all instructions.

If the pending instruction is not a condition-based branch instruction, routine 44 branches to block 50, interrupt-based prediction adjustment routine 44 is ended, and program execution resumes at the point where the original program code was interrupted. However, if the pending instruction is a branch instruction, block 52 evaluates the instruction and determines whether the branch will be taken. With reference to FIG. 2, this can be done be examining the values stored on LIFO stack 32 as described above. Of course, those skilled in the art will recognize how to evaluate a pending branch instruction in a particular computer system when the present invention is adapted for use in that computer system.

In another embodiment, decision block 48 first determines whether the pending instruction is a branch instruction. If it is a branch instruction, the "yes" branch is taken to block 52 as described above. If it is not a branch instruction, block 48 then executes instructions by emulating instructions until a branch instruction is reached. In comparing this method to the method described above, there are tradeoffs that must be assessed by an implementor of the present invention in determining which method is more efficient. As noted above, approximately 15% of instructions are branch instruction, so on average, an interrupt will catch a branch instruction once every six or seven interrupts. On the other hand, the performance of emulation is between 20 and 100 times worse than direct instruction execution, and in a typical instruction mix a branch instruction is encountered, on average, once every five or six instructions. Therefore, on average, several instructions must be emulated before a branch instruction is reached. Of course, every interrupt eventually results in the evaluation of a branch instruction. Note that the branch instruction itself does not have to be emulated because it can be executed directly after routine 44 ends. Whether an implementor decides to emulate instructions to reach a branch instruction, or interrupt until a branch instruction is "caught" will depend on several factors, such as the efficiency of routine 44, the efficiency of emulation, and the ratio of branch instructions to other instructions in the instruction mix. In certain environments it may be desirable to use both methods on the same system based on the mix of programs that are executing, and such use is within the scope of the present invention.

After the branch condition is evaluated at block 52, the branch prediction is evaluated at block 54. In computer systems that execute instructions in accordance with the Hewlett-Packard PA-RISC instruction set, a branch prediction is encoded in a branch instruction based on the order of the operands.

Decision block 56 determines whether the branch prediction is correct by comparing the branch prediction with the actual branch that must be taken in accordance with the evaluation of the branch prediction performed at block 52. If the prediction is correct, routine 44 branches to block 58, which updates branch history, and then routine 44 ends at block 50. If the branch is incorrect, block 60 potentially updates the prediction based on branch history, and then updates the branch history.

Branch history is used to provide a more accurate branch prediction. However, it is not required by the present invention. For example, the branch prediction may simply be changed when it is incorrect. All that is needed is the prediction from block 54 (which may be encoded in the branch instruction), and the evaluation of the branch condition at block 52.

One simple branch history algorithm simply changes a prediction when the prediction is wrong after two successive evaluations. To illustrate how branch history can increase branch prediction, consider a program loop that loops 100 times, then does not loop. Without branch history, there is a 1 in 100 chance that the looping branch instruction will be evaluated at the last iteration of the loop, thereby changing the prediction from "branch" to "no branch", which is not a good prediction for the branch instruction. With a branch history algorithm as described immediately above, the looping branch instruction must be evaluated at the last iteration of the loop twice in a row to change the prediction. The chances of this happening are 1 in 10,000. Therefore, the accuracy of the prediction associated with the looping branch instruction is increased by branch history.

Obviously, to include branch history when modifying a prediction, the branch history must be saved. Encoding branch history in the branch instruction was disclosed by Hanan Potash in U.S. Pat. No. 4,435,756. However, when branch history is stored in the branch instruction, the branch instruction must be written back to memory whenever the branch is evaluated, even when the prediction is correct.

While the Hewlett-Packard PA-RISC instruction set defines a method for encoding a branch prediction in an instruction, it does not define a method for encoding branch history within a branch instruction. In accordance with the present invention, in one embodiment branch predictions are stored in a history table in program memory that is 32K bits and is addressed by applying a hash function to the address of the branch instruction to determine the location in the table that represents a particular branch instruction. In hardware-based branch prediction schemes of the prior art, it is common to have history tables that are approximately 0.5–2.0K in size. One of the advantages of the present invention is that since it may be implemented in software, it is easy to adjust the size of the history table to achieve maximum performance.

Branch history may be encoded in various ways. For example, the referenced bit in the history table may be defined to be a first value if the branch was taken and a second value if the branch was not being taken. Alternatively, the referenced bit may be defined to be a first value if the previous prediction proved to be correct and a second value if the previous prediction proved to be incorrect. The latter encoding scheme has the advantage of reducing problems associated with aliasing. Consider two branch instructions that are associated with the same entry in a branch history table due to aliasing. Since most branch predictions are correct, there is a high probability that both branch instructions will encode the table entry as "previous prediction correct". On the other hand, if the former encoding scheme is used, and one instruction has the prediction "taken" and the other has the prediction "not taken", it is much more likely that the two branch instructions will interfere with each other when accessing the branch history table. In addition, the latter scheme provides an advantage when first initializing the branch history table, since all entries of the table may be initialized to "previous prediction correct".

It is also within the scope of the invention to use more sophisticated branch history algorithms. For example, a branch history table may be defined to keep a running average of branch behavior for a particular branch instruction, and update the prediction based on the running average. Those skilled in the art will recognize that a variety of algorithms may be used to keep track of branch history and adjust a branch prediction based on the branch history. Since the present invention may be implemented in software, it is easy for a programmer to try various algorithms to determine which works best in a particular environment. In addition, it is possible to use complex prediction algorithms that would not be practical to implement in hardware.

As mentioned above, block 58 updates the history table when the prediction is correct, and block 60 updates the history table and potentially updates the prediction when the prediction is incorrect. In the vast majority of prediction/history algorithms, one would never change a prediction when the prediction proves to be correct, and it is not contemplated that one would wish to do so when implementing the present invention. However, it is within the scope of the present invention to also change the prediction in block 58 if required by a particular algorithm.

Block 60 updates branch history and also may change the prediction. For example, as described above, if the prediction is incorrect, but was correct the previous time the branch instruction was executed, the prediction may not be changed. Another reason why it is beneficial to use branch history to determine whether a branch prediction should be changed is because it tends to reduce the frequency of branch prediction changes. Using the Hewlett-Packard PA-RISC instruction set, each time a prediction is changed the branch instruction must be written back to memory. Therefore, it is desirable to minimize the frequency of prediction changes to the extent that overall prediction accuracy is not significantly affected.

If the prediction must be updated, block 60 also updates the prediction. While the PA-RISC instruction set includes a prediction within a branch instruction, it is also within the scope of the invention to encode predictions using any other methods known in the art, such as a prediction table.

When updating a prediction encoded into an instruction, the instruction op code must be updated and the instruction must be written back to memory. With reference to FIG. 1, a branch instruction may be stored in L1 cache 14, L2 cache 16, main memory 18, virtual memory storage disk 22, and permanent storage disk 20. Though a programmer may not wish to write the branch instruction back to each of these storage devices, it is certainly within the scope of the invention to do so.

In an embodiment of the present invention, branch instructions are written back to L1 cache 14, L2 cache 16, and main memory 18, but not permanent storage disk 20 nor virtual memory storage disk 22. Writing data back to permanent storage disk 20 results in a minimal performance increases, and may create a host of problems related to managing executable code. Also, it is common for multiple users to share common program files, so it would not be possible to have each user store branch history in common files. However, it may be advantageous to store updated branch predictions back to disk 20 in certain situation.

While there are fewer problems writing branch instructions back to virtual memory storage disk 22, doing so results in little performance increase and incurs significant overhead. In contrast, writing branch instructions back to L1 cache 14, L2 cache 16, and main memory 18 produces significant performance increases.

Various computer systems use various techniques to manage memory. For example, it is common to associate a dirty bit with a block of memory in a cache to indicate whether that block may simply be discarded from the cache when no longer needed, or must be written back to main memory to reflect a change in the memory block. Those skilled in the art will recognize how to use these techniques to implement the invention as desired. For example, if it is desired to write altered branch instructions only to L1 cache 14 and L2 cache 16, but not main memory 18, then the dirty bit of a block containing an altered branch instruction may be left clear on L2 cache 16 to indicate that the block may be discarded and need not be written back to main memory 18. Alternatively, if the dirty bit is set, the block (and the altered branch instruction with the updated prediction) must be written back to main memory 18 before the memory block containing the branch instruction is displaced, thus preserving the updated branch prediction, but consuming additional computing resources.

It may also be desirable to treat various types of code differently. For example, it may be desirable to adjust branch predictions for kernel code, but not user code. Likewise, a programmer may wish to turn off branch prediction while debugging a program to prevent branch instructions from changing during program execution. Those skilled in the art will recognize situations wherein it is desirable to use or not use the present invention, and will be able to provide programmers and computer users appropriate interfaces for doing so.

After block 60 updates the branch history and possibly updates the branch prediction, routine 44 branches to block 50 and the routine terminates.

The present invention provides a system and apparatus for dynamically adjusting branch predictions by interrupting a CPU and examining a pending branch instruction. The present inventions combines the advantages of prior-art software and hardware techniques.

Although the present invention is described herein as being implemented using software, it may also be implemented in hardware or microcode. When implemented in software, the present invention is easy to configure. Such parameters as interrupt interval and history table size may be easily adjusted and the performance changes observed to allow the present invention to be tuned for optimal performance. Typically, this is not possible with prior-art hardware-based branch prediction.

Prior art software-based branch prediction encodes a prediction into branch instructions, but the prediction is static. The present invention may be implemented on systems designed to interpret a static software-encoded branch prediction, thereby providing such systems with dynamic branch prediction. The present invention also provides larger history and prediction memories than prior art branch prediction schemes, since these memories may be defined as software data structures.

Another significant advantage provided by the present invention is that while it dynamically adjusts predictions over time, it can do so at a much lower frequency than prior art prediction schemes. In the prior art, branch prediction tended to be at one extreme or another. Prior art software-based branch prediction generated predictions once, and then locked them into the coding of the instructions where the prediction was not altered doing execution. On the other hand, prior art hardware-based branch prediction evaluated a branch instruction every time that branch instruction was executed. A significant amount of hardware is required to perform this function without degrading performance. In addition, if the prediction tends to be stable (and most predictions are), little is gained be evaluating the prediction every time the branch instruction is executed, and if the prediction alternates often, then continually changing the prediction does not offer a significant performance increase either.

The present invention strikes a balance between never updating a prediction and updating a prediction every time a branch instruction is executed. In one of the embodiments discussed above, the CPU is only interrupted once every 15 million instructions. Since the branch prediction of a branch instruction is evaluated so infrequently, it is possible to spend additional time updating the prediction without incurring a significant amount of overhead. For this reason, the present invention is very effective when implemented in software.

Relatively infrequent evaluation can also be an asset when implementing the present invention in hardware. Such an implementation could be much simpler than prior art hardware branch prediction techniques because evaluating and updating the prediction may take significantly longer without affecting overall system performance. Since less hardware is dedicated to branch prediction, more hardware is available to speed up other functions of the CPU.

The present invention provides a significant performance improvement over prior-art branch prediction schemes. Simulations have shown a 4% to 8% improvement over prior hardware predictions schemes and a 10% to 15% improvement over prior software prediction schemes.

Although the present invention has been described with reference to preferred embodiments, workers skilled in the art will recognize that changes may be made in form and detail without departing from the spirit and scope of the invention.

What is claimed is:

1. A method of adjusting a branch prediction associated with a branch instruction contained in a segment of program code that is being executed by a central processing unit, the method comprising:

interrupting execution of the program code when execution of the branch instruction by the central processing unit is pending;

executing a prediction adjustment routine that updates the branch prediction; and resuming execution of the program code.

2. The method of claim 1 wherein interrupting execution of the program code when execution of the branch instruction by the central processing unit is pending comprises:

initializing a timer to a time interval;

waiting for the time interval to expire; and interrupting execution of the program code when the time interval has expired.

3. The method of claim 2 and further comprising:

waiting for the branch instruction after the time interval has expired.

4. The method of claim 2 wherein initializing a timer to a time interval comprises:

initializing a timer to a random time interval.

5. The method of claim 1 wherein interrupting execution of the program code when execution of the branch instruction by the central processing unit is pending comprises:

initializing an instruction counter to an instruction count;

counting instructions as they are executed; and interrupting execution of the program code when a number of instruction that have been executed equals the instruction count.

6. The method of claim 5 and further comprising:

waiting for the branch instruction after the instruction count has been reached.

7. The method of claim 5 initializing an instruction counter to an instruction count comprises:

initializing an instruction counter to a random instruction count.

8. The method of claim 1 wherein interrupting execution of the program code when execution of the branch instruction by the central processing unit is pending comprises:

executing a break instruction that interrupts execution of the program code; and replacing the break instruction with the branch instruction.

9. The method of claim 1 wherein interrupting execution of the program code when execution of the branch instruction by the central processing unit is pending comprises:

setting a flag that causes the branch instruction to generate an interrupt; and interrupting execution of the program code after when the first break instruction after setting the flag is encountered.

10. The method of claim 1 wherein executing a prediction adjustment routine that updates the branch prediction:

evaluating a branch condition of the branch instruction to determine whether the branch instruction will branch;

evaluating a branch prediction associated with the branch instruction;

determining whether the branch prediction is correct or incorrect; and toggling the branch prediction if the branch prediction is incorrect.

11. The method of claim 1 wherein executing a prediction adjustment routine that updates the branch prediction comprises:

evaluating a branch condition of the branch instruction to determine whether the branch instruction will branch;

evaluating a branch prediction associated with the branch instruction;

determining whether the branch prediction is correct or incorrect;

saving whether the branch prediction is correct or incorrect as branch history;

updating the branch prediction based on branch history and determining whether the branch prediction is correct or incorrect.

12. The method of claim 11 wherein updating the branch prediction based on branch history and determining whether the branch prediction is correct or incorrect comprises:

toggling the branch prediction if the prediction is incorrect when evaluated twice in a row.

13. The method of claim 1 wherein executing a prediction adjustment routine that updates the branch prediction includes:

examining a pending instruction to determine whether the pending instruction is the branch instruction; and resuming execution of the program code if the pending instruction is not the branch instruction.

14. The method of claim 1 wherein executing a prediction adjustment routine that updates the branch prediction includes:

examining a pending instruction to determine whether the pending instruction is the branch instruction; and emulating execution of instructions from the program code if the pending instruction is not the branch instruction, until the branch instruction is reached.

15. A computer system comprising:

a memory system for storing computer instructions, wherein a portion of the computer instructions comprise a branch prediction adjustment routine that when executed evaluates a pending branch instruction and updates a branch prediction associated with the pending branch instruction based on whether the branch prediction is correct; and a central processing unit for executing the computer instructions, the central processing unit including:

an interrupt unit for launching the branch prediction adjustment routine in response to an interrupt.

16. The computer system of claim 15 wherein the interrupt unit includes a timer that measures a time interval and generates the interrupt when the time interval has expired.

17. The computer system of claim 15 wherein the interrupt unit includes an instruction counter that can be initialized to an instruction count and generates the interrupt after a number instructions that have been executed equals the instruction count.

18. The computer system of claim 15 wherein the interrupt unit generates the interrupt after encountering a break instruction.

19. The computer system of claim 15 and further comprising:

a status flag that causes the interrupt unit to generate the interrupt when the branch instruction is pending.

20. The computer system of claim 15 wherein the branch prediction adjustment routine evaluates a pending branch instruction and updates a branch prediction associated with the pending branch instruction based on whether the branch prediction is correct and based on branch history.

21. The computer system of claim 20 wherein the branch prediction adjustment routine toggles the branch prediction if the branch prediction is incorrect when evaluated twice in a row.

22. A program storage medium having computer readable program code thereon for adjusting a branch prediction associated with a branch instruction contained in a segment of executable program code that is being executed by a central processing unit, the program storage medium comprising:

a first segment of the computer readable program code for causing interruption of execution of the executable program code when execution of the branch instruction by the central processing unit is pending;

a second segment of the computer readable code for adjusting the branch prediction associated with the branch instruction;

a third segment of the computer readable program code for executing the second segment of the computer readable code in response to an interrupt caused by the first segment of the computer readable code; and a fourth segment of the computer readable program code that resumes execution of the executable program code.

23. A program storage medium readable by a computer, tangibly embodying program instructions executable by the computer to implement a method that adjusts a branch prediction associated with a branch instruction contained in a segment of program code that is being executed by a central processing unit, the method comprising:

interrupting execution of the program code when execution of the branch instruction by the central processing unit is pending;

executing a prediction adjustment routine that updates the branch prediction; and resuming execution of the program code.

\* \* \* \* \*